H. W. ZAHN.
HARVESTER AND BINDER.
APPLICATION FILED JULY 29, 1913.
1,102,847.
Patented July 7, 1914.
2 SHEETS—SHEET 1.
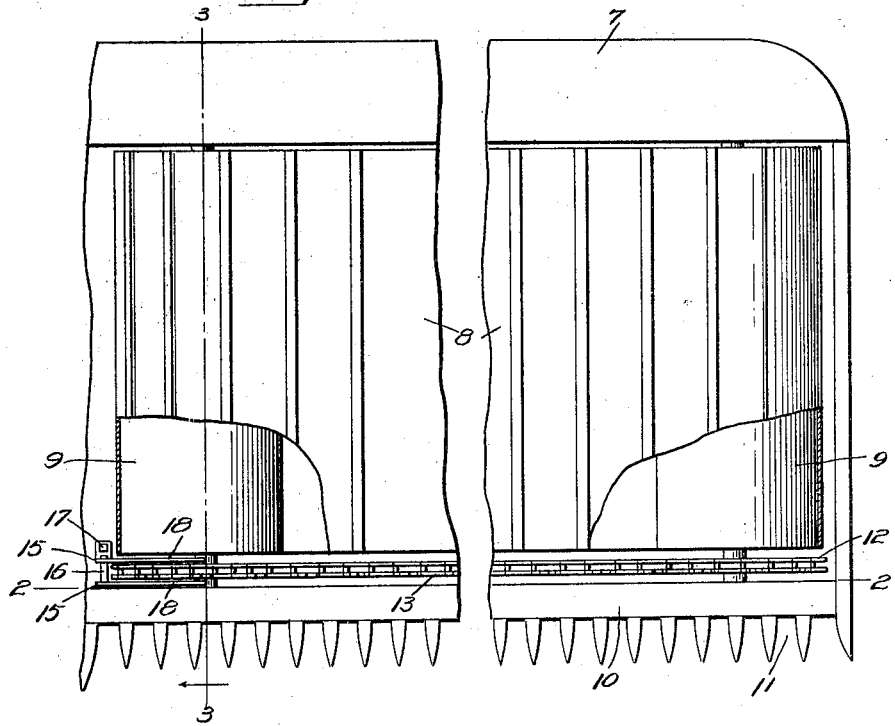
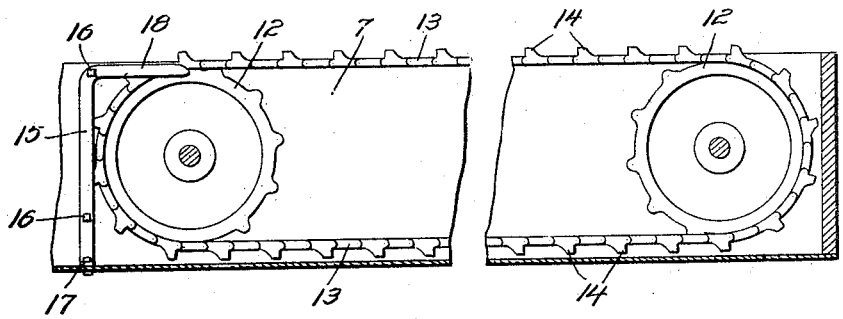
Witnesses
F. C. Gibson.
Inventor
Henry W. Zahn
By Victor J. Evans
Attorney

H. W. ZAHN.
HARVESTER AND BINDER.
APPLICATION FILED JULY 29, 1913.

1,102,847.

Patented July 7, 1914.
2 SHEETS—SHEET 2.

Inventor
Henry W. Zahn

Witnesses
F. C. Gibson.

By Victor J. Evans
Attorney

UNITED STATES PATENT OFFICE.

HENRY W. ZAHN, OF SYRACUSE, NEBRASKA.

HARVESTER AND BINDER.

1,102,847. Specification of Letters Patent. Patented July 7, 1914.

Application filed July 29, 1913. Serial No. 781,819.

*To all whom it may concern:*

Be it known that I, HENRY W. ZAHN, a citizen of the United States, residing at Syracuse, in the county of Otoe and State of Nebraska, have invented new and useful Improvements in Harvesters and Binders, of which the following is a specification.

This invention relates to harvesters and binders, and it has particular reference to the grain carrying mechanism associated with the platform.

The principal object of the invention is to provide a construction whereby the butts of the grain which, when the customary carrying mechanism is used are apt to lag behind, will be carried as fast or a trifle faster than the heads, thereby causing the butts and the heads to be almost evenly alined when the packers are reached, and thereby enabling firm and even bundles to be made and loss of grain to be avoided by loose and imperfect tying.

A further object of the invention is to simplify and improve the construction and arrangement of parts whereby the aforementioned object is attained.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 3:
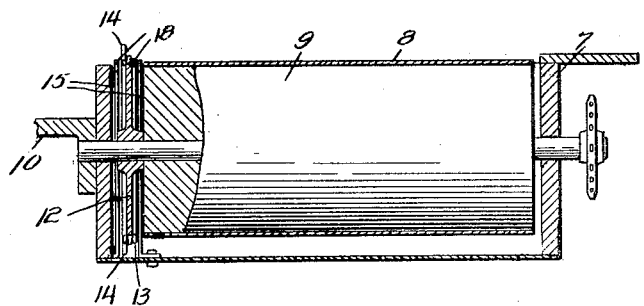
Figure 4:
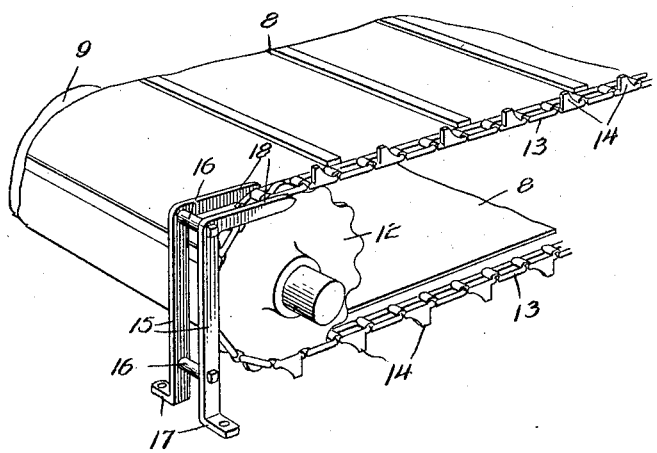

In the drawings,—Figure 1 is a top plan view of a binder platform equipped with the improvement constituting the present invention. Fig. 2 is a vertical sectional view taken on the line 2—2 in Fig. 1. Fig. 3 is a vertical transverse sectional view taken on the line 3—3 in Fig. 1. Fig. 4 is a perspective detail view of parts of the device.

Corresponding parts in the several figures are denoted by like characters of reference.

The platform 7 supports the customary endless carrier or apron 8 which is guided over rollers 9, one of which is driven for the purpose of causing the apron to move in the proper direction. Cutting apparatus of the customary kind is provided, the same including the finger bar 10 and a reciprocatory cutter bar 11.

The rollers 9 are provided at their front ends with sprocket wheels 12 which may, if desired, be of a diameter slightly exceeding that of the rollers. Over the sprockets 12 is guided an endless chain 13, the links of which are provided at intervals with lugs 14, the latter being formed at right angles to the links so that the said lugs when the parts are assembled for operation will be disposed in an approximately vertical plane, the lugs associated with the upper lead of the chain extending upwardly adjacent to the front edge of the apron 8.

Suitably mounted or supported on the frame of the machine in any convenient position is a stripping member consisting of arms or uprights 15 which are connected together and spaced apart by cross pieces 16, said arms being connected at their lower ends with supporting members 17, preferably of a resilient nature, and said arms being provided at their upper ends with fingers 18, said fingers admitting between them the lugs of the chain 13, the stripping member being so supported and positioned that the fingers 18 will straddle the chain. When the machine is in operation, the butt ends of straws engaging between the lugs 14 will be stripped from the chain by the fingers 18, thus permitting the straws to be carried along by the carrying mechanism provided for the purpose, whereby said straws are conveyed to the packing and binding mechanism and thereby avoiding straws being carried along with the chain which might result in choking or interrupting the operation thereof.

From the foregoing description, taken in connection with the drawings hereto annexed, the operation and advantages of this invention will be readily understood. The invention, it will be seen, is of such a nature that it may be readily applied to ordinary harvesters and binders. In the ordinary harvester and binder a good deal of difficulty is frequently experienced in this that the butt ends of the grain which are lighter than the heads will lag behind the heads as the straw is carried along by the conveying mechanism. The result is that by the time the packers are reached, the grain will be presented obliquely to the packers instead of straight, and the bundles will be loose, uneven and otherwise imperfect, and large quantities of grain are frequently lost owing to this cause. By the present simple invention it will be seen that the butts of the grain will be fed equally as fast, or if necessary a trifle faster, than the heads while the grain is on the platform, thereby causing the grain to be straightened out and delivered to the packers in a straight and perfect condition.

Having thus described the invention, what is claimed as new, is—

1. In a device of the class described, an endless conveyer, rollers over which the conveyer is trained, and an auxiliary endless element trained over the rollers adjacent to one edge of the conveyer, said auxiliary endless element being provided at intervals with lugs projecting substantially at right angles to the plane of the endless conveyer.

2. In a device of the class described, a platform having rollers, an apron guided over said rollers, sprocket wheels on the rollers adjacent to one edge of the apron, and a chain guided over the sprockets, the links of said chain being provided at intervals with lugs extending substantially at right angles to the plane of the apron.

3. In a device of the class described, a platform having rollers, and an apron guided over said rollers, sprockets mounted on the forward ends of the rollers, said sprockets being of a diameter slightly exceeding that of the rollers, and a chain guided over the sprockets, the links of said chain being provided at intervals with lugs extending substantially at right angles thereto.

4. In a device of the class described, a platform having rollers, an apron guided over the rollers, sprockets on the front ends of said rollers, a chain guided over the sprockets adjacent to the front edge of the apron, the links of said chain being provided at intervals with lugs extending substantially at right angles thereto, and a stripping member having fingers between which the chain is guided.

5. In a device of the class described, a platform having rollers, an apron guided over the rollers, sprockets on the front ends of the rollers, a chain guided over the sprockets and provided at intervals with lugs extending from the links thereof, and a stripping member supported adjacent to one of the apron carrying rollers and comprising suitably connected arms having terminal stripping fingers positioned adjacent to opposite sides of the chain.

In testimony whereof I affix my signature in presence of two witnesses.

HENRY W. ZAHN.

Witnesses:
JAMES FAIRHEAD,
HARRY AMENDE.